US006429332B1

(12) United States Patent
Tanimoto et al.

(10) Patent No.: US 6,429,332 B1
(45) Date of Patent: *Aug. 6, 2002

(54) CATALYST FOR PRODUCTION OF ACRYLIC ACID AND METHOD FOR PRODUCTION OF ACRYLIC ACID BY THE USE OF THE CATALYST

(75) Inventors: Michio Tanimoto; Tatsuya Kawajiri; Hiromi Yunoki; Yukio Aoki, all of Hyogo (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/456,085

(22) Filed: May 31, 1995

(30) Foreign Application Priority Data

May 31, 1994 (JP) .............................. 6-118228

(51) Int. Cl.$^7$ ...................... C07C 51/16; C07C 51/235; B01J 27/053; B01J 23/28
(52) U.S. Cl. ...................... 562/532; 562/531; 562/535; 502/220; 502/312; 502/318; 502/321; 502/353; 502/345; 502/313; 502/315; 502/316; 502/324
(58) Field of Search ................................ 502/321, 306, 502/308, 312, 313, 315, 316, 318, 324, 325, 340, 345, 349, 353, 217, 220, 304; 558/319, 320, 321, 322, 323, 324; 562/532, 531, 535

(56) References Cited

U.S. PATENT DOCUMENTS

| | | | |
|---|---|---|---|
| 3,567,773 A | | 3/1971 | Yamaguchi et al. |
| RE29,901 E | | 2/1979 | Wada et al. |
| 4,309,361 A | * | 1/1982 | Suresh et al. ............... 502/321 |
| 4,710,484 A | * | 12/1987 | Dolhj et al. ............... 502/321 |
| 4,746,753 A | * | 5/1988 | Brazdil et al. ............. 558/324 |
| 4,781,862 A | * | 11/1988 | Goliaszewski |
| 4,843,055 A | * | 6/1989 | Glaeser et al. ............. 502/202 |
| 4,866,194 A | * | 9/1989 | Glaeser et al. ............. 558/319 |
| 4,956,519 A | * | 9/1990 | Hollstein et al. |
| 5,079,207 A | * | 1/1992 | Brazdil et al. ............. 502/205 |
| 5,157,199 A | * | 10/1992 | Soled et al. |
| 5,212,136 A | * | 5/1993 | Angstadt et al. |
| 5,236,692 A | * | 8/1993 | Nagashima et al. |
| 5,330,954 A | * | 7/1994 | Cadot et al. |
| 5,345,028 A | * | 9/1994 | Alerasool |
| 5,401,478 A | * | 3/1995 | Chang et al. |
| 5,491,278 A | * | 2/1996 | Angstadt et al. |
| 5,516,964 A | * | 5/1996 | Umansky et al. |
| 5,518,978 A | * | 5/1996 | Flego et al. |
| 5,618,974 A | * | 4/1997 | Kurimoto et al. |
| 5,700,752 A | * | 12/1997 | Kurimoto et al. |
| 5,780,383 A | * | 7/1998 | Hollstein et al. |
| 5,981,804 A | * | 11/1999 | Kurimoto et al. |

FOREIGN PATENT DOCUMENTS

| | | |
|---|---|---|
| EP | 0427508 | 11/1990 |
| JP | 5025914 | 12/1970 |
| JP | 5885091 | 12/1976 |
| JP | 596181 | 8/1979 |
| JP | 5940056 | 8/1979 |
| JP | 01288339 | 5/1988 |
| JP | 05293375 | 4/1992 |

OTHER PUBLICATIONS

"Solid Speracid in This Decade", Kazushi Araki. No date available.
Yamaguchi, T. "Recent Progress in Solid Superacid", Applied Catalysis, 61 (1990) pp. 1–25.
European Search Report, Nov. 2, 1995, EP 95 10 8272.

* cited by examiner

*Primary Examiner*—Steven P. Griffin
*Assistant Examiner*—Christina Ildebrando
(74) *Attorney, Agent, or Firm*—Selitto, Behr & Kim

(57) ABSTRACT

A catalyst for the production of acrylic acid by the vapor-phase catalytic oxidation of acrolein or acrolein-containing gas and a method for the production of acrylic acid by the use of this catalyst are provided. The catalyst of this invention comprises (A) a catalyst having Mo and V as essential components and used for the production of acrylic acid by vapor-phase catalytic oxidation of acrolein and (B) a solid acid having acid strength (Ho) of not more than −11.93. Since this catalyst excels in catalytic activity and service life, it allows acrylic acid to be produced stably at a high yield for a long time.

12 Claims, No Drawings

CATALYST FOR PRODUCTION OF ACRYLIC ACID AND METHOD FOR PRODUCTION OF ACRYLIC ACID BY THE USE OF THE CATALYST

BACKGROUND OF THE INVENTION

1. Field of the Invention

This invention relates to a catalyst for the production of acrylic acid and a method for the production of acrylic acid by the use of this catalyst. More particularly, it relates to a catalyst for producing acrylic acid by the vapor-phase catalytic oxidation of acrolein or an acrolein-containing gas and to a method for the production of acrylic acid by the vapor-phase catalytic oxidation of acrolein or an acrolein-containing gas in the presence of this catalyst.

2. Description of the Prior Art

Various improved catalysts have been proposed for the efficient production of acrylic acid by the vapor-phase catalytic oxidation reaction of acrolein or an acrolein-containing gas. Most of the catalysts which have been heretofore proposed have molybdenum and vanadium as main components thereof. For example, JP-B-44-12,129 discloses a catalyst comprising molybdenum, vanadium and tungsten, JP-B-49-11,371 a catalyst comprising molybdenum, vanadium, copper, tungsten and chromium, JP-B-50-25,914 a catalyst comprising molybdenum and vanadium, JP-B-52-85,091 a catalyst comprising molybdenum, vanadium, copper and (at least one element selected among antimony and germanium).

These conventional molybdenum-vanadium type catalysts, however, are deficient not only in the yield of acrylic acid in the light of the industrial production but also in the service life of the catalyst because of the rapid decrease of the activity. The development of a catalyst for the production of acrylic acid which excels in activity and stability, and further permits the production of acrylic acid at high yield and stably for a long time has been longed for.

Solid acids whose magnitudes of acid strength (Ho) (hereinafter referred to simply as "acid strength" or occasionally as "Ho") are not more than −11.93 are generally called as solid super acids as introduced in detail in "SHOKUBAI," Vol. 31, No. 7 (1989), pp. 512 through 518, for example. According to the literature, the super acid is defined as an acid possessing acidity stronger than that of 100% sulfuric acid (Ho$\leq$−11.93) and is reported to be usable under more moderate conditions than the ordinary acid catalysts in such reactions as decomposition, isomerization, alkylation, polymerization, acylation, dehydration, and dehydrogenation of hydrocarbon which are referred to as acid catalytic reactions. The fact that this super acid, particularly when combined with a molybdenum-vanadium type catalyst, is effective in inducing the vapor-phase catalytic oxidation reaction of acrolein or acrolein-containing gas has not been known at all to the art.

One object of this invention, therefore, is to provide a catalyst for producing acrylic acid at a high yield by the vapor-phase catalytic oxidation reaction of acrolein or acrolein-containing gas.

Another object of this invention is to provide a catalyst for the production of acrylic acid, which permits the production of acrylic acid by the vapor-phase catalytic oxidation reaction of acrolein or acrolein-containing gas stably for a long period.

Still another object of this invention is to provide a catalyst for the production of acrylic acid by the vapor-phase catalytic oxidation reaction of acrolein or acrolein-containing gas, which catalyst excels in terms of catalytic activity and service life and permits stable production of acrylic acid at high productivity for a long time.

Yet another object of this invention is to provide a method for producing acrylic acid efficiently by the use of the catalyst for the production of acrylic acid mentioned above.

SUMMARY OF THE INVENTION

The objects mentioned above are accomplished by a catalyst for producing acrylic acid by the oxidation of acrolein or acrolein-containing gas in a vapor phase with a molecular oxygen-containing gas, which catalyst comprises (A) a composite oxide having molybdenum and vanadium as essential components and adapted for the production of acrylic acid by the vapor-phase catalytic oxidation of acrolein and (B) a solid acid having acid strength (Ho) of not more than −11.93 (Ho$\leq$−11.93). These objects are further accomplished, in the vapor-phase catalytic oxidation reaction for producing acrylic acid by the oxidation of acrolein or acrolein-containing gas in the vapor phase with the molecular oxygen-containing gas, by a method for the production of acrylic acid which effects the reaction in the presence of the catalyst for the production of acrylic acid mentioned above.

The present inventors have learnt that a catalyst composition which combines a molybdenum-vanadium type composite oxide which has been usually known as a catalyst for the production of acrylic acid with a solid acid having acid strength of not more than −11.93 possesses high activity at low temperatures as compared to conventional catalysts and excels in stability as a catalyst. This invention have been perfected on the basis of this knowledge.

Since the catalyst of this invention maintains high activity, it aids in the production of acrylic acid at a high yield.

Since the catalyst of this invention excels in terms of service life and maintains this outstanding quality for a long time, it permits acrylic acid to be produced stably for a long time. Even after a protracted use, this catalyst can continue the reaction for the production of acrylic acid at the same degree of yield as during the initial stage of the reaction without appreciably increasing the reaction temperature.

Since the catalyst of this invention exhibits high activity even at low temperatures, it aids in effecting the reaction at the same degree of yield at reaction temperatures lower than those necessary for the conventional methods.

Since the catalyst of this invention suffers no degradation of catalytic property even under high-load operation conditions aimed at a high productivity, it permits acrylic acid to be produced stably with high operational efficiency for a long time.

By the method of this invention, acrylic acid can be produced efficiently and advantageously on a commercial scale.

DESCRIPTION OF THE PREFERRED EMBODIMENT

Now, this invention will be described in detail below.

Component (A):

As the component (A), any of the well-known composite oxide catalysts which have molybdenum and vanadium as essential components and are used for producing acrylic acid by the vapor-phase catalytic oxidation of acrolein can be used. In these catalysts, those catalysts which are represented by the following general formula (1):

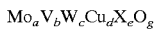

(wherein Mo is molybdenum, V is vanadium, W is tungsten, Cu is copper, X is at least one element selected from the group consisting of Mg, Ca, Sr and Ba, and 0 is oxygen, and a, b, c, d, e, and g are atomic ratios respectively of Mo, V, W, Cu, X, and 0 such that b is a numeral in the range of 2 to 14, c in the range of 0 to 12, d in the range of 0 to 6 excluding 0 ($0<d\leq6$) (0.1 to 6, for example), e in the range of 0 to 3, and g is a numeral to be determined by the oxidized states of the elements when a is fixed at 12), are advantageously used. Particularly, the catalysts which are represented by the following general formula (2):

(wherein Mo is molybdenum, V is vanadium, W is tungsten, Cu is copper, X is at least one element selected from the group consisting of Mg, Ca, Sr and Ba, Y is at least one element selected from the group consisting of Ti, Zr, Ce, Cr. Mn, Fe, Co, Ni, Zn, Nb, Sn, Sb, Pb and Bi, and 0 is oxygen, and a, b, c, d, e, f, and g are atomic ratios respectively of Mo, V, W, Cu. X, Y, and 0 such that b is a numeral in the range of 2 to 14, c in the range of 0 to 12, d in the range of 0 to 6 excluding 0 ($0<d\leq6$) (0.1 to 6, for example), e in the range of 0 to 3, f in the range of 0 to 3, and g is a numeral to be determined by the oxidized states of the elements when a is fixed at 12), are advantageously used.

These catalysts are not discriminated on account of their methods of preparation. They may be prepared by any of the well-known methods. The compound containing the relevant elemental component as a starting material is not particularly limited by its kind. Any of the oxides which contain the relevant elemental component or the compounds which produce the oxides when calcined can be used. As typical examples of the compound which produces the oxides when calcined, hydroxides, metallic acids, nitrates, carbonates, ammonium salts, acetates, and formates may be cited. The compound which contains two or more elemental components cited above is likewise usable.

Generally, the composite oxide of the component (A) is obtained by suitably dissolving compounds containing relevant elemental components as a starting material in required amounts as in an aqueous medium, for example, heating and stirring them in the medium, then evaporating the resultant liquid mixture to dryness, and further pulverizing the resultant dry mixture when necessary.

Component (B):

The solid super acid as the component (B) is known, as remarked in the literature "SHOKUBAI" mentioned above, in two kinds, sulfuric acid-carried super acid and oxide-carried super acid. As typical examples of these kinds, the following super acids (1) through (7) may be cited.

(1) Super acids of $SO_4$/oxide of a metal of Group IV in the Periodic Table of Elements:

In the metals of Group IV in the Periodic Table of Elements, zirconium, titanium, tin, and hafnium are favorably used. These metals may be used in the form of a mixture of two or more members. As typical examples of the super acid of this category, $SO_4$/zirconium oxide, $SO_4$/titanium oxide, $SO_4$/tin oxide, and $SO_4$/hafnium oxide may be cited. They are represented as $SO_4/ZrO_2$, $SO_4/TiO_2$, $SO_4/SnO_2$, and $SO_4/HfO_2$ respectively. These super acids are dealt with in such publications as "Advances in Catalysis", Vol. 37, pp. 182–191 (1990) and "Applied Catalysis", Vol. 61, pp. 1 to 25 (1990) besides "SHOKUBAI" mentioned above.

The method for the preparation of these super acids will be explained below with respect to zirconium as an example. The $SO_4$/zirconium oxide super acid is obtained by combining zirconium hydroxide or amorphous zirconium oxide with a sulfate ion-containing solution such as, for example, sulfuric acid or an aqueous sulfuric acid solution, then removing an excess of the sulfate ion-containing solution, subsequently drying the resultant wet mixture, and calcining the dry mixture in the atmosphere of an inert gas such as air or nitrogen gas at a temperature in the range of $350°$ to 800° C., preferably 400° to 700° C. for a period in the approximate range of 1 to 10 hours, preferably 2 to 8 hours. The super acid of other metal can be prepared by following this procedure while using the hydroxide or amorphous oxide of the metal instead.

It is generally held that, in the super acid which is obtained as described above, the sulfate ion ($SO_4^{2-}$) is bound to or carried on a metal oxide. This super acid is expressed as $SO_4$/metal oxide ($MeO_x$) in the publications "SHOKUBAI" and "Advances in Catalysis" mentioned above. The super acids which are used in the present invention, therefore, will be expressed after this manner.

(2) $SO_4$/iron oxide super acid:

This super acid is expressed as $SO_4/Fe_2O_3$ and is dealt with in the publications of "SHOKUBAI" and "Advances in Catalysis" and in "Chemistry Letters", pp. 1259 to 1260 (1979) as well.

This super acid is obtained by combining the hydroxide or amorphous oxide of iron with a sulfate ion-containing solution such as, for example, sulfuric acid or an aqueous sulfuric acid solution, then removing an excess of the sulfate ion-containing solution from the resultant liquid mixture, then drying the wet mixture, and calcining the dry mixture in the atmosphere of an inert gas such as air or nitrogen gas at a temperature in the range of 350° to 800° C., preferably 400° to 650° C. for a period in the approximate range of 1 to 10 hours, preferably 2 to 8 hours.

(3) $SO_4$/silicon oxide super acid:

This super acid is expressed as $SO_4/SiO_2$ and dealt with in the publications of "SHOKUBAI" and "Advances in Catalysis" mentioned above.

This super acid is obtained by combining silica gel with a sulfur-containing compound such as, for example, sulfuryl chloride, then drying the resultant liquid mixture, and subsequently calcining the dry mixture in the atmosphere of an inert gas such as air or nitrogen gas at a temperature in the range of 300° to 600° C., preferably 350° to 500° C. for a period in the approximate range of 1 to 10 hours, preferably 2 to 8 hours.

(4) $SO_4$/aluminum oxide super acid:

This super acid is expressed as $SO_4/Al_2O_3$ and dealt with in the publications of "SHOKUBAI" and "Advances in Catalysis" mentioned above.

This super acid is obtained by combining y-alumina or aluminum hydroxide with a sulfate ion-containing solution such as, for example, sulfuric acid or an aqueous sulfuric acid solution, removing an excess of the sulfate ion-containing solution, then drying the resultant wet mixture, and subsequently calcining the dry mixture in the atmosphere of an inert gas such as air or nitrogen gas at a temperature in the range of 350° to 800° C., preferably 400° to 700° C. for a period in the approximate range of 1 to 10 hours, preferably 2 to 8 hours.

(5) Tungsten oxide, molybdenum oxide, or tungsten-molybdenum composite oxide/zirconium oxide super acid:

These super acids are expressed as $WO_3/ZrO_2$, $MoO_3/ZrO_2$, and $WO_3$–$MoO_3/ZrO_2$ and dealt with in the publications of "SHOKUBAI", "Chemistry Letters", and "Advances in Catalysis" and in "J. Chem. Soc., Chem. Commun.", pp. 1059 to 1060 (1988) as well.

These super acids are obtained by depositing a compound of tungsten and/or molybdenum on zirconium hydroxide or amorphous zirconium oxide and then calcining the resultant composite in the atmosphere of an inert gas such as air or nitrogen gas at a temperature in the range of 500 to 1,000° C., preferably 650° to 850° C., for a period in the approximate range of 1 to 10 hours, preferably 2 to 8 hours.

The amount of tungsten oxide, molybdenum oxide, or tungsten-molybdenum composite oxide to be deposited is generally in the range of 1 to 40% by weight, based on the amount of zirconium oxide.

(6) Super acid of tungsten oxide/tin oxide, titanium oxide, iron oxide, or composite oxide of at least two elements selected among tin, titanium, and iron:

These super acids are expressed as $WO_3/SnO_2$, $WO_3/TiO_2$, $WO_3/Fe_2O_3$, $WO_3/SnO_2$—$TiO_2$, $WO_3/SnO_2$—$Fe_2O_3$, $WO_3/TiO_2$—$Fe_2O_3$, and $WO_3/SnO_2$—$TiO_2$—$Fe_2O_3$ and dealt with in the publication of "SHOKUBAI" and in "Stud. Surf. Soc. Catal.", Vol. 75, pp. 2613 to 2616 (1953) as well.

These super acids are obtained by depositing a tungsten compound on at least one compound selected from the group consisting of stannic hydroxide, amorphous stannic oxide, titanium hydroxide, amorphous titanium oxide, ferric hydroxide, and amorphous ferric oxide and then calcining the resultant composite in the atmosphere of an inert gas such as air or nitrogen gas at a temperature in the range of 650° to 1,200° C., preferably 650° to 1,000° C., for a period in the approximate range of 1 to 10 hours, preferably 2 to 8 hours.

The amount of tungsten oxide to be carried is generally in the range of 1 to 40% by weight, based on the amount of the oxide such as tin oxide or titanium oxide.

(7) Super acid of phosphorus tungstate and/or an alkali metal salt thereof:

These super acids are expressed as $H_3P_1W_{12}O_{40}$ and $H_{3-x}A_xP_1W_{12}O_{40}$, [wherein A is an alkali metal (sodium, potassium, rubidium, and/or cesium) and x is above 0 and below 3 (0<x<3)]. These super acids are dealt with in "Chem. Tech.", November (1993), pp. 28 to 29, These super acids are obtained by calcining phosphorus tungstate or alkali salts thereof in the atmosphere of an inert gas such as air or nitrogen gas at a temperature in the range of 350° to 500° C., preferably 380° to 450° C., for a period in the approximate range of 1 to 10 hours, preferably 2 to 8 hours.

As the component (B) according to this invention, two or more of the various super acids mentioned above may be used in a combined form.

Some of the solid acids to be used as the component (B) show degrees of acid strength of not more than −16.04 (Ho≦−16.04). These degrees cannot be definitely determined, however, because no methods have yet been established for determining acid strength less than −16.04, The super acids (1) through (7) mentioned above invariably show degrees of acid strength of not more than −11.93 and, therefore, can be effectively used as the component (B) of this invention.

The acid strength in this invention has been determined by the following method which is now in general use.

When a color of a sample subjected to the determination is white, this sample is immersed in benzene and a benzene solution containing an acid-base indicator of a known pKa value is added thereto. The sample is kept under observation until the indicator on the surface of the sample assumes the color of acidity. The smallest value of pKa at which the color of acidity is assumed is reported as the acid strength of the sample.

The indicators (pKa) which are usable for this determination include m-nitrotoluene (−12.0), p-nitrotoluene (−12.4), p-nitrochlorobenzene (−12.7), m-nitrochlorobenzene (−13.2), 2,4-dinitrotoluene (−13.8), and 1,3,5-trinitrobenzene (−16.0), for example.

When a given sample has a color, the sample is first placed in a container provided with a gas inlet and a gas outlet line. Then the container holding the sample is evacuated until thorough expulsion of the entrapped air and ammonia gas is introduced into the container and adsorbed on the sample. Then, the ammonia gas is gradually discharged from the container and meanwhile the temperature of the container is gradually elevated. The ammonia gas discharged at a varying level of the temperature in the container is collected with liquefied nitrogen. The amount of ammonia thus collected is determined on the weight of the sample. By rating this amount with the aid of a calibration curve separately obtained with samples of known degrees of acid strength, the acid strength of the sample is calculated.

Catalyst:

The catalyst of this invention contains the component (A) and the component (B) mentioned above. The amount of the component (B) based on the weight of the component (A) (as oxide) is generally in the range of 0.1 to 30% by weight, preferably 0.2 to 20% by weight. If the amount of the component (B) is less than 0.1% by weight, the effect of the addition of this component (B) will not be satisfactorily obtained. Conversely, if the amount exceeds 30% by weight, the activity of the catalyst will be found to decrease, the selectivity to acrylic acid from acrolein will be unduly small, and the selectivity to $C_2$ and CO will be unduly large. To be specific, when a component (B) is used singly, a reaction of forming $C_2$ and CO is easily carried out because the conversion of acrolein and the selectivity to acrylic acid are unduly low. The component (B), therefore, is a component to be disadvantageously used singly in the vapor-phase catalytic oxidation reaction according to this invention.

It, however, was demonstrated that by introducing a component (B) into a component (A), the selectivity to acrylic acid from acrolein and the activity by the use of the component (A) are improved. Particularly when a component (B) is introduced into a component (A) in such a proportion as mentioned above, the component (B) can prominently manifest its effects as a cocatalyst.

The catalyst which contains the component (A) and the component (B) is not particularly discriminated on account of the method adopted for its preparation. It can be prepared by any desired method. For example, the method which comprises first preparing the components each in a powdery form and then mixing them homogeneously by the use of a ball mill and the method which comprises causing the component (B) prepared in advance to be dispersed in the component (A) at any desired stage during the preparation of the component (A) may be adopted.

The catalyst is not particularly discriminated on account of its shape. It may be in any desired shape such as, for example, pellets, beads, cylinders, rings, and tablets. The average diameter of the catalyst particles is generally in the range of 1 to 15 mm, preferably 3 to 10 mm. In this case, in the deposited catalyst may be incorporated therein such inorganic fibers as glass fibers or various whiskers which are widely known to permit effective improvement of the strength and the attrition loss of the catalyst. Further, for the purpose of controlling the physical properties of the catalyst with high repeatability, such additives as ammonium nitrate, cellulose, starch, polyvinyl alcohol, and stearic acid which are generally known as powder binders may be used.

The catalyst of this invention can be used all by itself. Optionally, it may be used as deposited on an inert carrier such as, for example, alumina, silica-alumina, silicon carbide, titanium oxide, magnesium oxide, or aluminum sponge.

The catalyst of this invention is calcined at a temperature in the range of 300° to 600° C., preferably 350° to 500° C., for a period in the approximate range of 1 to 10 hours, preferably 2 to 8 hours.

Vapor-phase catalytic oxidation:

The vapor-phase catalytic oxidation reaction of acrolein or acrolein-containing gas according to this invention is not particularly discriminated and can be carried out by such methods as are generally adopted for this reaction mentioned above. For example, a mixed gas comprising 1 to 15% by volume, preferably 4 to 12% by volume of acrolein, 0.5 to 25% by volume, preferably 2 to 20% by volume of oxygen, 0 to 30% by volume, preferably 3 to 25% by volume of steam and 20 to 80 % by volume, preferably 50 to 70% by volume of an inert gas such as nitrogen gas is brought into contact with the catalyst of this invention at a temperature in the range of 180° to 350° C., preferably 200° to 330° C., under a pressure in the range of normal pressure to 10 atmospheres (or naturally under a reduced pressure), preferably normal pressure to 8 atmospheres, at a space velocity (STP) in the range of 500 to 20,000 $hr^{-1}$, preferably 1,000 to 10,000 $hr^{-1}$.

As raw material gases which are usable in this invention, in addition to a mixed gas comprising acrolein, oxygen and an inert gas, an acrolein-containing mixed gas obtained by directly oxidizing propylene and optionally combining with air or oxygen, and steam in advance can be used. Such oxidized products as acrylic acid, acetaldehyde and acetic acid, carbon oxide, propane and unaltered propylene which are by-products contained in the acrolein-containing mixed gas obtained by directly oxidizing propylene have no adverse influences on the catalyst composition to be used in this invention.

The method of this invention can be carried out either on a solidified bed or a fluidized bed.

Function:

The physical and chemical differences between a catalyst with a lowered activity and a virgin catalyst such as of various changes of physical properties of the composite oxide catalyst represented by the general formula (1) as a component (A), e.g., a change of surface area or pore volume, and a change of acidity shows a correlation of the change with time of properties of the catalyst with the changes of acid amount and base amount to be determined from the amount of propylene and acetone produced via decomposition reaction of isopropyl alcohol. The acid amount determined through the medium of the decomposition reaction of isopropyl alcohol is equal to the amount of propylene produced. The base amount similarly determined is equal to the ratio of the amount of produced acetone/the amount of produced propylene. When the surface areas and pore volumes of the virgin catalyst of $Mo_{12}V_{5.5}W_1Cu_{2.5}Sr_{0.25}$ (atomic ratios except for that of oxygen) and the catalyst having the properties thereof deteriorated by the continuous catalytic vapor-phase oxidation reaction of acrolein for a period of 8,000 hours were tested, the surface areas determined by BET method of the virgin catalyst and the catalyst after the reaction for 8,000 hours were respectively 3 $m^2/g$ and 2.8 $m^2/g$ which are not outstandingly different. Similarly, the pore volumes of the virgin catalyst and the catalyst after the reaction for 8,000 hours were respectively 0.23 cc/g and 0.22 cc/g which are not outstandingly different neither. On the other hand, when the acid amount and base amount to be produced by the decomposition reaction of isopropyl alcohol were measured, the acid amount (amount of propylene produced) and base amount (amount of produced acetone/amount of produced propylene) of the catalyst after the reaction for 8,000 hours were respectively 1.0 mmol/g of catalyst and 0.8 per hour as compared with those of the virgin catalyst of 2.5 mmols/g of catalyst and 0.5, Other words, the acid amount is extremely decreased and the base amount is increased after the use of the catalyst. This result shows the relationship of the changes of the acid amount and base amount as one cause of the decrease of activity of the catalyst. The service life or the stability of properties of the catalyst can be estimated by determining the acid amount and base amount produced by decomposition reaction of isopropyl alcohol, and comparing these amounts before and after the reaction (see Example 20 and Control 3).

The function of the component (B) in the catalyst of this invention has not yet been fully elucidated. It is, however, inferred that the component (B) contributes to the high yield because the strong acidity of the component (B) promotes the adsorption of such reactive substances as acrolein on the catalyst and consequently exalts the activity of the catalyst and also promotes the elimination of acrylic acid as a product, and further because the component (B) represses the production of such by-products as acetic acid and maleic acid. It is further considered that the component (B) contributes to stabilize the composite oxide of the component (A) because the component (B) possesses a large surface area and moreover excels in resistance to heat. It should be noted, however, that this invention is not restricted by such theoretical consideration as mentioned above.

Now, this invention will be more specifically described below with reference to working examples. The terms "conversion of acrolein", "selectivity to acrylic acid", and "per pass yield of acrylic acid" are defined as follows.

Conversion of acrolein (%)=[(Number of mols of acrolein reacted)/(Number of mols of acrolein fed to the reaction)] (×100)

Selectivity to acrylic acid (%)=[(Number of mols of acrylic acid formed)/(Number of mols of acrolein reacted)] (×100)

Per pass yield of acrylic acid (%)=[(Number of mols of acrylic acid formed)/(Number of mols of acrolein fed to the reaction)] (×100)

Further, the acid strength of the solid acid was measured in the same manner as mentioned above.

EXAMPLE 1

Preparation of Catalyst:
Component (A)

In 7,500 ml of heated water, 1,050 g of ammonium paramolybdate, 335 g of ammonium paratungstate and 348 g of ammonium metavanadate were placed and stirred until dissolution. Separately, in 3,000 ml of heated water, 360 g of copper nitrate and 64 g of magnesium nitrate were placed and stirred until dissolution. Two solution thus obtained were mixed together, heated for concentration, and thereafter evaporated to dryness on a water bath. The resultant dry mixture was dried at 120° C. Then, the resultant dry solid mixture was pulverized to a size of about 100 meshes to obtain a molybdenum-vanadium type composite oxide powder (hereinafter referred to as "Powder A-1").

Component (B)

In deionized water, 267 g of zirconium oxynitrate was wholly dissolved. The solution was kept stirred and aqua ammonia was gradually added thereto until a pH level reaches 8 to give rise to zirconium hydroxide. The formed zirconium hydroxide was separated by filtration, washed thoroughly with deionized water, and then dried at 100° C. for 24 hours, to obtain 155 g of dried zirconium hydroxide. The dry zirconium hydroxide was added to an aqueous solution of sulfuric acid separately prepared at a concentration of 1 N. The resultant solution was kept stirred at room temperature for 24 hours, and separated by filtration, and dried for 24 hours. The powder consequently obtained was calcined in a stream of air at 500° C for three hours to obtain $S_4/ZrO_2$ super acid powder having acid strength of –14.5 (hereinafter referred to as "Powder (B-1)").

A catalyst (1) was obtained by thoroughly mixing the powder (A-1) with the powder (B-1), molding the resultant mixture to obtain pellets of 5 mm in diameter and 6 mm in length, and calcining the pellets at 400° C. for 6 hours. The ratio of the powder (B-1) to the powder (A-1) (as oxide; invariably applicable hereinafter) was 4.0% by weight. The composition of metal elements of this catalyst (1) by atomic ratio (excluding oxygen; invariably applicable hereinafter) was as follows.

$$Mo_{12}V_6W_{2.5}Cu_3Mg_{0.5}-(Zr_1S_{0.02})$$

Oxidation reaction:

A U-shaped tube of steel of 25 mm in diameter was packed with 800 ml of the catalyst (1). A mixed gas containing 4% by volume of acrolein, 5% by volume of oxygen, 20% by volume of steam and 71% by volume of nitrogen gas was introduced into the U-shaped tube and subjected to the oxidation reaction at a reaction temperature of 220° C. and a contacting time of 1.8 seconds. The results are as shown in Table 1, Control 1

Preparation of catalyst:

A catalyst (2) was prepared by following the procedure of Example 1 while using only the powder (A-1) without using the powder (B-1).

Oxidation reaction:

The oxidation reaction was carried out by following the procedure of Example 1 while using the catalyst (2) in place of the catalyst (1). The results are as shown in Table 1.

Comparison of Example 1 and Control 1 reveals that the catalyst (1) of this invention excels the catalyst (2) for comparison in catalytic activity.

EXAMPLE 2

Preparation of catalyst:

In 2,500 ml of heated water, 350 g of ammonium paramolybdate, 44.6 g of ammonium paratungstate and 96.6 g of ammonium metavanadate were placed and stirred until dissolution. Separately, in 750 ml of heated water, 100 g of copper nitrate was placed and stirred until dissolution. After two solution thus obtained were mixed together, 20.8 g of the powder (B-1) obtained in Example 1 was added to the resultant mixed solution.

The mixed solution thus obtained was placed in a porcelain evaporator on a water bath, and 1,000 ml of spherical carrier which comprises a-alumina and has a diameter in the range of 3 to 5 mm, a surface area of not more than 1 m²/g and a porosity in the range of 40 to 50%, and further possesses such a distribution of pores that the pores having a pore diameter of not more than 500μm accounts for not less than 90% of all pores was added thereto and the resultant solution was evaporated to dryness with stirred thereby depositing the powder (B-1) on the carrier. The deposited carrier was calcined at 400° C. for 6 hours, to prepare a catalyst (3). The composition of elements of this catalyst (3) was shown as following and the ratio of the powder (B-1) to the powder (A-2) was 4.8% by weight, provided that the powder (A-2) is defined as the composition obtained by removing the powder (B-1) from the total catalyst composition.

$$Mo_{12}V_5W_1Cu_{2.5}-(Zr_1S_{0.02})$$

Oxidation reaction:

The oxidation reaction was carried out by following the procedure of Example 1 while using the catalyst (3) in place of the catalyst (1). The results are as shown in Table 1.

EXAMPLES 3 AND 4

Preparation of catalyst:

Catalysts (4) and (5) having the composition of elements as shown below were obtained by following the procedure of Example 2 while changing the amount of the powder (B-1) added. The ratios of the powder (B-1) to the powder (A-2) were 19.3% by weight and 0.5% by weight respectively.

$$Mo_{12}V_5W_1Cu_{2.5}-(Zr_4S_{0.08}) \qquad \text{Catalyst (4)}$$

$$Mo_{12}V_5W_1Cu_{2.5}-(Zr_{0.1}S_{0.002}) \qquad \text{Catalyst (5)}$$

Oxidation reaction:

The oxidation reaction was carried out by following the procedure of Example 1 while using the catalyst (4) or (5) in place of the catalyst (1). The results are as shown in Table 1,

EXAMPLES 5 TO 19

Preparation of Catalyst:

Catalysts (6) and (20) having the composition of elements as shown below were obtained by following the procedure of Example 2.

$$Mo_{12}V_5W_1Cu_{2.5}Sr_{0.25}-(Zr_1S_{0.02}) \qquad \text{Catalyst (6)}$$

The ratio of the component (B) to the component (A) was 4.7% by weight.

$$Mo_{12}V_6W_1Cu_3Ti_2-(Zr_1S_{0.02}) \qquad \text{Catalyst (7)}$$

The ratio of the component (B) to the component (A) was 4.2% by weight.

$$Mo_{12}V_4W_{0.5}Cu_2Mn_2-(Zr_1S_{0.02}) \qquad \text{Catalyst (8)}$$

The ratio of the component (B) to the component (A) was 5.1% by weight.

$$Mo_{12}V_6W_{2.5}Cu_2Ni_1-(Zr_{0.5}S_{0.01}) \qquad \text{Catalyst (9)}$$

The ratio of the component (B) to the component (A) was 2.0% by weight.

$$Mo_{12}V_5W_1Cu_{2.5}Co_{0.5}-(Zr_1S_{0.02}) \qquad \text{Catalyst (10)}$$

The ratio of the component (B) to the component (A) was 4.7% by weight.

$$Mo_{12}V_{5.5}W_1Cu_{2.5}Zn_{0.25}-(Zr_2S_{0.04}) \quad \text{Catalyst (11)}$$

The ratio of the component (B) to the component (A) was 9.2% by weight.

$$Mo_{12}V_5W_1Cu_2Fe_{0.25}-(Zr_{0.1}S_{0.002}) \quad \text{Catalyst (12)}$$

The ratio of the component (B) to the component (A) was 0.5% by weight.

$$Mo_{12}V_4W_1Cu_2Ba_{0.5}Cr_{0.1}-(Zr_4S_{0.08}) \quad \text{Catalyst (13)}$$

The ratio of the component (B) to the component (A) was 19.2% by weight.

$$Mo_{12}V_6W_{1.5}Cu_3Sr_{0.25}Zr_1-(Zr_{0.5}S_{0.01}) \quad \text{Catalyst (14)}$$

The ratio of the component (B) to the component (A) was 2.1% by weight.

$$Mo_{12}V_8W_{2.5}Cu_{3.5}Nb_{0.5}-(Zr_{0.5}S_{0.01}) \quad \text{Catalyst (15)}$$

The ratio of the component (B) to the component (A) was 1.8% by weight.

$$Mo_{12}V_8W_3Cu_4Ca_{0.5}Pb_{0.25}-(Zr_1S_{0.02}) \quad \text{Catalyst (16)}$$

The ratio of the component (B) to the component (A) was 3.5% by weight.

$$Mo_{12}V_5W_1Cu_2Mg_{0.25}Sb_{0.5}-(Zr_{0.5}S_{0.01}) \quad \text{Catalyst (17)}$$

The ratio of the component (B) to the component (A) was 2.3% by weight.

$$Mo_{12}V_6W_1Cu_{2.5}Sn_{0.5}-(Zr_{0.2}S_{0.004}) \quad \text{Catalyst (18)}$$

The ratio of the component (B) to the component (A) was 0.9% by weight.

$$Mo_{12}V_5W_1Cu_{2.5}Ce_{0.5}-(Zr_1S_{0.02}) \quad \text{Catalyst (19)}$$

The ratio of the component (B) to the component (A) was 4.6% by weight respectively.
Catalyst (20)

$$Mo_{12}V_6W_{2.5}Cu_2Bi_{0.5}-(Zr_2S_{0.04}) \quad \text{Catalyst (20)}$$

The ratio of the component (B) to the component (A) was 7.8% by weight.

Oxidation reaction:

The oxidation reaction was carried out by following the procedure of Example 1 while using the catalysts (6) to (20) in place of the catalyst (1). The results are as shown in Table 2.

Control 2

Preparation of Catalyst:

A catalyst (21) was prepared by following the procedure of Example 2 while omitting the addition of the powder (B-1).

Oxidation reaction:

The oxidation reaction was carried out by following the procedure of Example 1 while using the catalyst (21) in place of the catalyst (1). The results are as shown in Table 1.

Comparison of Example 2 and Control 2 reveals that the catalyst (3) of this invention excels the catalyst (21) for comparison in catalytic activity.

TABLE 1

|  | Catalyst No. | Conversion of acrolein (mol %) | Yield of acrylic acid (mol %) | Selectivity of acrylic acid (mol %) |
|---|---|---|---|---|
| Example 1 | (1) | 99.0 | 94.3 | 95.3 |
| Example 2 | (3) | 99.2 | 95.0 | 95.8 |
| Example 3 | (4) | 99.4 | 94.0 | 94.6 |
| Example 4 | (5) | 98.9 | 94.9 | 96.0 |
| Control 1 | (2) | 96.8 | 91.6 | 94.6 |
| Control 2 | (21) | 96.9 | 92.0 | 95.0 |

TABLE 2

|  | Catalyst No. | Conversion of acrolein (mol %) | Yield of acrylic acid (mol %) | Selectivity of acrylic acid (mol %) |
|---|---|---|---|---|
| Example 5 | (6) | 98.9 | 94.5 | 95.6 |
| E0xample 6 | (7) | 99.0 | 94.5 | 95.5 |
| Example 7 | (8) | 99.1 | 94.2 | 95.1 |
| Example 8 | (9) | 98.7 | 94.0 | 95.2 |
| Example 9 | (10) | 98.8 | 94.1 | 95.2 |
| Example 10 | (11) | 98.6 | 94.0 | 95.3 |
| Example 11 | (12) | 99.0 | 94.3 | 95.3 |
| Example 12 | (13) | 99.1 | 94.2 | 95.1 |
| Example 13 | (14) | 99.4 | 94.4 | 95.0 |
| Example 14 | (15) | 99.2 | 94.1 | 94.9 |
| Example 15 | (16) | 99.0 | 94.3 | 95.3 |
| Example 16 | (17) | 99.0 | 94.6 | 95.6 |
| Example 17 | (18) | 99.1 | 94.4 | 95.3 |
| Example 18 | (19) | 98.8 | 94.1 | 95.2 |
| Example 19 | (20) | 98.6 | 94.0 | 95.3 |

EXAMPLE 20

Oxidation reaction:

The oxidation reaction using the catalyst (3) obtained in Example 2 was continued for 8,000 hours under the same conditions as those in Example 1, The results after the reaction for 8,000 hours are shown in Table 3.

The acid amounts and base amounts of the virgin catalyst (3) and the catalyst (3) after the use for a period of 8,000 hours were determined by decomposition reaction of isopropyl alcohol and are shown in Table 3.

Control 3

Oxidation reaction:

The oxidation reaction was carried out by following the procedure of Example 20 while using the catalyst (21) in place of the catalyst (3). The acid amount and base amount of the catalyst (21) were determined in the same manner as in Example 20, The results are as shown in Table 3.

It is remarked from the comparison of the results of Example 20 with those of Control 3 that the catalyst (3) of this invention excels the catalyst (21) for comparison in durability.

13 14 …

TABLE 3

| Catalyst No. | Reaction temperature (° C.) | Conversion of acrolein (mol %) | Yield of acrylic acid (mol %) | Selectivity of acrylic acid (mol %) | Virgin catalyst | | Catalyst after 8000 hours' use | |
|---|---|---|---|---|---|---|---|---|
| | | | | | acid amount | base amount | acid amount | base amount |
| Example 20 (3) | 224 | 99.2 | 95.2 | 96.0 | 3.0 | 0.4 | 2.8 | 0.5 |
| Control 3 (21) | 239 | 98.7 | 92.4 | 93.6 | 2.5 | 0.5 | 1.0 | 0.8 |

EXAMPLE 21

Oxidation reaction:

The oxidation reaction was carried out by following the procedure of Example 1 while using the catalyst (3) in place of the catalyst (1) and changing the contacting time to 1.2 seconds. The results are as shown in Table 4.

Control 4

Oxidation reaction:

The oxidation reaction was carried out by following the procedure of Example 21 while using the catalyst (21) in place of the catalyst (3). The results are as shown in Table 4.

It is remarked from the comparison of the results of Example 21 with those of Control 4 that the catalyst (3) of this invention excels the catalyst (21) for comparison in catalytic activity even under a high-load condition.

EXAMPLE 22

Oxidation reaction:

The oxidation reaction was carried out by following the procedure of Example 1 while using the catalyst (3) in place of the catalyst (1) and changing the proportions of acrolein and nitrogen gas in the raw material gas to 6% by volume and 69% by volume respectively. The results are as shown in Table 4.

Control 5

Oxidation reaction:

The oxidation reaction was carried out by following the procedure of Example 22 while using the catalyst (21) in place of the catalyst (3). The results are as shown in Table 4.

It is remarked from the comparison of the results of Example 22 with those of Control 5 that the catalyst (3) of this invention excels the catalyst (22) for comparison in catalytic activity even when the concentration of acrolein in the raw material gas is increased.

TABLE 4

| Catalyst No. | Conversion of acrolein (mol %) | Yield of acrylic acid (mol %) | Selectivity of acrylic acid (mol %) |
|---|---|---|---|
| Example 21 (3) | 98.8 | 94.5 | 95.6 |
| Control 4 (21) | 96.2 | 90.9 | 94.5 |
| Example 22 (3) | 99.0 | 94.4 | 95.4 |
| Control 5 (21) | 96.3 | 90.7 | 94.2 |

EXAMPLE 23

Preparation of catalyst:

A $SO_4/TiO_2$ super acid powder having acid strength of −13.8 (hereinafter referred to as "Powder (B-2)") was prepared by following the procedure for the preparation of the powder (B-1) in Example 1 while using titanium tetrachloride in place of zirconium oxychloride and changing the calcination temperature to 550° C. Then, a catalyst (22) was prepared by following the procedure of Example 2 while using the powder (B-1) in place of the powder (B-1). The ratio of the powder (B-1) to the powder (A-2) was 1.5% by weight. The composition of elements of this catalyst (22) in atomic ratio was as follows.

$$Mo_{12}V_5W_1Cu_{2.5}-(Ti_{0.5}S_{0.01})$$

Oxidation reaction:

An oxidation reaction was carried out by following the procedure of Example 1 while using the catalyst (22) in place of the catalyst (1). The results are as shown in Table 5.

EXAMPLE 24

Preparation of catalyst:

A $SO_4/SnO_2$ super acid powder having acid strength of −12.7 (hereinafter referred to as "Powder (B-3)") was prepared by following the procedure used for the preparation of the powder (B-1) in Example 1 while using stannic chloride in place of zirconium oxychloride and changing the calcination temperature to 550° C. Then, a catalyst (23) was prepared by following the procedure of Example 2 while using the powder (B-3) in place of the powder (B-1). The ratio of the powder (B-3) to the powder (A-2) was 5.2% by weight. The composition of elements of this catalyst (23) in atomic ratio was as follows.

$$Mo_{12}V_5W_1Cu_{2.5}-(Sn_1S_{0.02})$$

Oxidation reaction:

An oxidation reaction was carried out by following the procedure of Example 1 while using the catalyst (23) in place of the catalyst (1). The results are as shown in Table 5.

EXAMPLE 25

Preparation of catalyst:

A $SO_4/HfO_2$ super acid powder having acid strength of −13.2 (hereinafter referred to as "Powder (B-4)") was prepared by following the procedure used for the preparation of the powder (B-1) in Example 1 while using hafnium chloride in place of zirconium oxychloride and changing the calcination temperature to 600° C. Then, a catalyst (24) was prepared by following the procedure of Example 1 while using the powder (B-4) in place of the powder (B-1). The ratio of the powder (B-4) to the powder (A-1) was 6.8% by weight. The composition of elements of this catalyst (24) in atomic ratio was as follows.

$$Mo_{12}V_6W_{2.5}Cu_3Mg_{0.5}-(Hf_1S_{0.02})$$

Oxidation reaction:

An oxidation reaction was carried out by following the procedure of Example 1 while using the catalyst (24) in place of the catalyst (1). The results are as shown in Table 5.

EXAMPLE 26

Preparation of catalyst:

A $SO_4/Fe_2O_3$ super acid powder having acid strength of −12.7 (hereinafter referred to as "Powder (B-5)") was prepared by following the procedure used for the preparation of the powder (B-1) in Example 1 while using iron chloride in place of zirconium oxychloride. Then, a catalyst (25) was prepared by following the procedure of Example 2 while using the powder (B-5) in place of the powder (B-1). The ratio of the powder (B-5) to the powder (A-2) was 3.1% by weight. The composition of elements of this catalyst (25) in atomic ratio was as shown below.

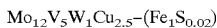
$Mo_{12}V_5W_1Cu_{2.5}-(Fe_1S_{0.02})$

Oxidation reaction:

An oxidation reaction was carried out by following the procedure of Example 1 while using the catalyst (25) in place of the catalyst (1). The results are as shown in Table 5.

EXAMPLE 27

Preparation of catalyst:

Silica gel was obtained by dissolving 100 g of ethyl silicate in deionized water, adding several drops of concentrated nitric acid to the resultant solution, and stirring the mixture. This silica gel was dried at 100° C., then immersed in sulfuryl chloride, and calcined at 400° C. to obtain a $SO_4/SiO_2$ super acid powder having acid strength of −12.7 (hereinafter referred to as "Powder (B-6)"). Then, a catalyst (26) was prepared by following the procedure of Example 2 while using the powder (B-6) in place of the powder (B-1). The ratio of the powder (B-6) to the powder (A-2) was 6.9% by weight. The composition of elements of this catalyst (26) in atomic ratio was as shown below.

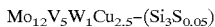
$Mo_{12}V_5W_1Cu_{2.5}-(Si_3S_{0.05})$

Oxidation reaction:

An oxidation reaction was carried out by following the procedure of Example 1 while using the catalyst (26) in place of the catalyst (1). The results are as shown in Table 5.

EXAMPLE 28

Preparation of catalyst:

A $SO_4/Al_2O_3$ super acid powder having acid strength of −13.8 (hereinafter referred to as "Powder (B-7)") was obtained by combining γ-alumina with 5N sulfuric acid and calcining the resultant mixture at 600° C. Then, a catalyst (27) was prepared by following the procedure of Example 1 while using the powder (B-7) in place of the powder (B-1). The ratio of the powder (B-7) to the powder (A-1) was 3.3% by weight. The composition of elements of this catalyst (27) in atomic ratio was as follows.

$Mo_{12}V_6W_{2.5}Cu_3Mg_{0.5}-(Al_2S_{0.07})$

Oxidation reaction:

An oxidation reaction was carried out by following the procedure of Example 1 while using the catalyst (27) in place of the catalyst (1). The results are as shown in Table 5.

EXAMPLE 29

Preparation of catalyst:

A $WO_3/ZrO_2$ super acid powder having acid strength of −13.8 (hereinafter referred to as "Powder (B-8)") was prepared by adding dry zirconium hydroxide as obtained in Example 1 to an aqueous solution of ammonium metatungstate, heating and stirring the resultant solution, evaporating the stirred solution to dryness, and thereafter calcining the powder at 800° C. Then, a catalyst (28) was prepared by following the procedure of Example 2 while using the powder (B-8) in place of the powder (B-1). The ratio of the powder (B-8) to the powder (A-2) was 3.2% by weight. The composition of elements of this catalyst (28) in atomic ratio was as shown below. The amount of $WO_3$ deposited on $ZrO_2$ was 12.5% by weight.

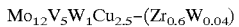
$Mo_{12}V_5W_1Cu_{2.5}-(Zr_{0.6}W_{0.04})$

Oxidation reaction:

An oxidation reaction was carried out by following the procedure of Example 1 while using the catalyst (28) in place of the catalyst (1). The results are as shown in Table 5.

EXAMPLE 30

A $MoO_3/ZrO_2$ super acid powder having acid strength of −12.7 (hereinafter referred to as "Powder (B-9)") was prepared by following the procedure for the preparation of the powder (B-8) in Example 29 while using ammonium paramolybdate in place of ammonium metatungstate. Then, a catalyst (29) was prepared by following the procedure of Example 2 while using the powder (B-9) in place of the powder (B-1). The ratio of the powder (B-9) to the powder (A-2) was 5.3% by weight. The composition of elements of this catalyst (29) in atomic ratio was as shown below. The amount of $MoO_3$ deposited on $ZrO_2$ was 11.7% by weight.

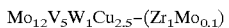
$Mo_{12}V_5W_1Cu_{2.5}-(Zr_1Mo_{0.1})$

Oxidation reaction:

An oxidation reaction was carried out by following the procedure of Example 1 while using the catalyst (29) in place of the catalyst (1). The results are as shown in Table 5.

EXAMPLE 31

Preparation of catalyst:

A $WO_3/SnO_2$ super acid powder having acid strength of −12.0 (hereinafter referred to as "Powder (B-10)") was prepared by following the procedure used for the preparation of the powder (B-8) in Example 29 while using dry tin hydroxide in place of dry zirconium hydroxide and changing the calcination temperature to 900° C. Then, a catalyst (30) was prepared by following the procedure of Example 1 while using the powder (B-10) in place of the powder (B-1). The ratio of the powder (B-10) to the powder (A-1) was 10.8% by weight. The composition of elements of this catalyst (30) in atomic ratio was as follows. The amount of $WO_3$ deposited on $SnO_2$ was 11.5% by weight.

$Mo_{12}V_6W_{2.5}Cu_3Mg_{0.5}-(Sn_2V_{0.15})$

Oxidation reaction:

An oxidation reaction was carried out by following the procedure of Example 1 while using the catalyst (30) in place of the catalyst (1). The results are as shown in Table 5.

EXAMPLE 32

Preparation of catalyst:

A $WO_3/TiO_2$ super acid powder having acid strength of −12.4 (hereinafter referred to as "Powder (B-10)") was prepared by following the procedure used for the preparation of the powder (B-8) in Example 29 while using dry titanium hydroxide in place of dry zirconium hydroxide and changing the calcination temperature to 750° C. Then, a catalyst (31) was prepared by following the procedure of Example 2 while using the powder (B-11) in place of the powder (B-1). The ratio of the powder (B-11) to the powder (A-2) was 7.0% by weight. The composition of elements of this catalyst (31) in atomic ratio was as follows. The amount of $WO_3$ deposited on $TiO_2$ was 14.5% by weight.

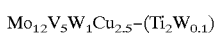
$Mo_{12}V_5W_1Cu_{2.5}-(Ti_2W_{0.1})$

Oxidation reaction:

An oxidation reaction was carried out by following the procedure of Example 1 while using the catalyst (31) in place of the catalyst (1). The results are as shown in Table 5.

EXAMPLE 33

Preparation of catalyst:

A $WO_3/Fe_2O_3$ super acid powder having acid strength of −12.0 (hereinafter referred to as "Powder (B-12)") was prepared by following the procedure used for the preparation of the powder (B-8) in Example 29 while using dry iron hydroxide in place of dry zirconium hydroxide and changing the calcination temperature to 650° C. Then, a catalyst (32) was prepared by following the procedure of Example 2 while using the powder (B-12) in place of the powder (B-1). The ratio of the powder (B-12) to the powder (A-2) was 3.4% by weight. The composition of elements of this catalyst (32) in atomic ratio was as shown below. The amount of $WO_3$ deposited on $Fe_2O_3$ was 11.6% by weight.

$$Mo_{12}V_5W_1Cu_{2.5}-(Fe_1W_{0.04})$$

Oxidation reaction:

An oxidation reaction was carried out by following the procedure of Example 1 while using the catalyst (32) in place of the catalyst (1). The results were as shown in Table 5.

EXAMPLE 34

Preparation of catalyst:

A compound of the following composition (excluding oxygen) was prepared by dissolving phosphorus tungstate in deionized water and adding the resultant solution to an aqueous solution obtained in advance by dissolving cesium nitrate in deionized water.

$$Cs_{2.5}H_{0.5}P_1W_{12}$$

A super acid powder (B-13) having acid strength of −12.4 ($Cs_{2.5}H_{0.5}P_1W_{12}$) was obtained by calcining this compound at 400° C. Then, a catalyst (33) was prepared by following the procedure of Example 2 while using the powder (B-13) in place of the powder (B-1). The ratio of the powder (B-13) to the powder (A-2) was 17.4% by weight. The composition of elements of this catalyst (33) in atomic ratio was as follows.

$$Mo_{12}V_5W_1Cu_{2.5}-(Cs_{2.5}H_{0.5}P_1W_{12})_{0.03}$$

Oxidation reaction:

An oxidation reaction was carried out by following the procedure of Example 1 while using the catalyst (33) in place of the catalyst (1). The results are as shown in Table 5.

TABLE 5

| | Catalyst No. | Conversion of acrolein (mol %) | Yield of acrylic acid (mol %) | Selectivity of acrylic acid (mol %) |
|---|---|---|---|---|
| Example 23 | (22) | 99.4 | 94.6 | 95.2 |
| Example 24 | (23) | 99.0 | 94.5 | 95.5 |
| Example 25 | (24) | 98.9 | 94.6 | 95.7 |
| Example 26 | (25) | 99.1 | 95.1 | 96.0 |
| Example 27 | (26) | 98.8 | 94.1 | 95.2 |
| Example 28 | (27) | 99.6 | 94.0 | 94.4 |
| Example 29 | (28) | 99.0 | 94.1 | 95.1 |
| Example 30 | (29) | 98.5 | 94.2 | 95.6 |
| Example 31 | (30) | 98.4 | 94.5 | 96.0 |
| Example 32 | (31) | 99.0 | 94.3 | 95.3 |
| Example 33 | (32) | 99.1 | 94.5 | 95.4 |
| Example 34 | (33) | 98.7 | 94.4 | 95.6 |

EXAMPLE 35

A mixed gas comprising 5% by volume of propylene (industrial grade propylene (purity of 94%)), 10% by volume of oxygen, 10% by volume of steam and 74.8% by volume of nitrogen gas was subjected to the vapor-phase catalytic oxidation reaction in the presence of a molybdenum-bismuth type catalyst. The resultant reacted mixed gas was introduced into a reactive tube having the catalyst (3) obtained in Example 2 packed therein in advance and subjected to the oxidation reaction at a temperature of 225° C. and for a contacting period of 1.2 seconds.

As a result of the reaction, with propylene, propane, acrylic acid, and acetic acid which had been introduced into the catalyst (3) and contained in the mixed gas regarded as not to be reacted, the conversion of acrolein was 99.2%, the selectivity to acrylic acid was 95.4%, and the per pass yield of acrylic acid was 94.6%.

From the results mentioned above, it is recognized that the catalysts of this invention have a high activity, and permit the stable production of acrylic acid from acrolein at a high yield.

What is claimed is:

1. A catalyst for producing acrylic acid by the oxidation of acrolein or acrolein-containing gas in a vapor phase with a molecular oxygen-containing gas, which catalyst comprises (A) a composite oxide having molybdenum and vanadium as essential components and adapted for the production of acrylic acid by the vapor-phase catalytic oxidation of acrolein and (B) a solid acid having acid strength (Ho) of not more than −11.93 (Ho ≦−11.93), wherein said component (A) is a composite oxide represented by the following general formula (1):

$$Mo_aV_bW_cCu_dX_eO_g,$$

wherein Mo is molybdenum, V is vanadium, W is tungsten, Cu is copper, X is at least one element selected from the group consisting of Mg, Ca, Sr and Ba, and O is oxygen, and a, b, c, d, e and g are atomic ratios respectively of Mo, V, W, Cu, X and O such that b is a numeral in the range of 2 to 14, c is in the range of 0 to 12, d is in the range of 0 to 6 excluding 0 (0<d≦6), e is in the range of 0 to 3, and g is a numeral to be determined by the oxides states of the elements when a is fixed at 12.

2. The catalyst according to claim 1 wherein said component (B) is a super acid containing $SO_4$ and a metal of Group IV in the Periodic Table of Elements.

3. The catalyst according to claim 2, wherein said metal of Group IV in the Periodic Table of Elements is at least one member selected from the group consisting of zirconium, titanium, tin, and hafnium.

4. The catalyst according to claims 1, wherein said component (B) is a $SO_4$/iron oxide super acid.

5. The catalyst according to any of claims 1, wherein said component (B) is a SO$_4$/silicon oxide super acid.

6. The catalyst according to any of claims 1, wherein said component (B) is a SO$_4$/aluminum oxide super acid.

7. The catalyst according to many of claims 1, wherein said component (B) is a tungsten oxide, molybdenum oxide, or tungsten-molybdenum composite oxide/zirconium oxide super acid.

8. The catalyst according to any of claims 1, wherein said component (B) is a super acid of tungsten oxide/tin oxide, titanium oxide, iron oxide, or composite oxide of at least two elements selected among tin, titanium, and iron.

9. The catalyst according to claims 1, wherein said component (B) is a super acid of phosphorus tungstate and/or an alkali metal salt thereof.

10. The catalyst according to claim 1 wherein the ratio of said component (B) to said component (A) on an oxide basis is in the range of 0.1 to 30% by weight.

11. A catalyst for producing acrylic acid by the oxidation of acrolein or acrolein-containing gas in a vapor phase with a molecular oxygen-containing gas, which catalyst comprises (A) a composite oxide having molybdenum and vanadium as essential components and adapted for the production of acrylic acid by the vapor phase catalytic oxidation of acrolein and (B) a solid acid having acid strength (Ho) of not more than −11.93 (Ho ≦−11.93), wherein said component (A) is a composite oxide represented by the following general formula (2):

$$Mo_aV_bW_cCu_dX_eY_fO_g$$

wherein Mo is molybdenum, V is vanadium, W is tungsten, Cu is copper, X is at least one element selected from the group consisting of Mg, Ca, Sr, and Ba, Y is at least one element selected from the group consisting of Ti, Zr, Ce, Cr, Mn, Fe, Co, Ni, Zn, Nb, Sn, Sb, Pb and Bi, and 0 is oxygen, and a, b, c, d, e, f, and g are atomic ratios respectively of Mo, V, W, Cu, X, Y, and O such that b is a numeral in the range of 2 to 14, c is in the range of 0 to 12, d is in the range of 0 to 6 excluding 0 (0<d≦6), e is in the range of 0 to 3, f is in the range of 0 to 3, and g is a numeral to be determined by the oxidized states of the elements when a is fixed at 12.

12. A method for the production of acrylic acid by the vapor-phase catalytic oxidation reaction of acrolein or acrolein-containing gas in a vapor phase with a molecular oxygen-containing gas, which method comprises effecting said reaction in the presence of the catalyst for the production of acrylic acid set forth in any of claims 1–11.

* * * * *